(12) United States Patent
Simpson et al.

(10) Patent No.: US 11,983,684 B2
(45) Date of Patent: May 14, 2024

(54) AUDIO-BASED SECURITY FOR AUTOMATED TELLER MACHINES

(71) Applicant: Capital One Services, LLC, McLean, VA (US)

(72) Inventors: Danielle Simpson, Manassas, VA (US); Saleem Ahmed Sangi, McLean, VA (US); Matthew B. Konopa, Falls Church, VA (US); Brian J. Oh, Clifton, VA (US)

(73) Assignee: Capital One Services, LLC, McLean, VA (US)

( * ) Notice: Subject to any disclaimer, the term of this patent is extended or adjusted under 35 U.S.C. 154(b) by 319 days.

(21) Appl. No.: 16/810,612

(22) Filed: Mar. 5, 2020

(65) Prior Publication Data

US 2021/0279700 A1    Sep. 9, 2021

(51) Int. Cl.
| | |
|---|---|
| G06Q 20/18 | (2012.01) |
| G06F 21/35 | (2013.01) |
| G06Q 20/10 | (2012.01) |
| G06Q 20/32 | (2012.01) |
| G10L 21/0232 | (2013.01) |
| G10L 25/51 | (2013.01) |

(52) U.S. Cl.
CPC ............ *G06Q 20/18* (2013.01); *G06F 21/35* (2013.01); *G06Q 20/1085* (2013.01); *G06Q 20/3224* (2013.01); *G06Q 20/3272* (2013.01); *G06Q 20/3276* (2013.01); *G10L 21/0232* (2013.01); *G10L 25/51* (2013.01)

(58) Field of Classification Search
CPC ............................... G06F 21/31; G06F 21/566
See application file for complete search history.

(56) References Cited

U.S. PATENT DOCUMENTS

| | | | |
|---|---|---|---|
| 7,600,676 B1 * | 10/2009 | Rados | G06Q 30/06 235/382 |
| 8,812,014 B2 | 8/2014 | Do | |
| 8,867,313 B1 | 10/2014 | Rivlin et al. | |
| 9,516,466 B2 | 12/2016 | Ruhstaller et al. | |
| 9,952,056 B2 | 4/2018 | Khasis | |

(Continued)

OTHER PUBLICATIONS

BofA adds ATM withdrawal prestaging to mobile app. https://www.paymentsdive.com/ex/mpt/news/bofa-adds-atm-withdrawal-prestaging-to-mobile-app/ (Year: 2017).*

(Continued)

*Primary Examiner* — Calvin L Hewitt, II
*Assistant Examiner* — Amanulla Abdullaev
(74) *Attorney, Agent, or Firm* — Sterne, Kessler, Goldstein & Fox P.L.L.C.

(57) ABSTRACT

Disclosed herein are system, method, and computer program product embodiments for verification of proximity to a kiosk, such as an ATM. The mobile application installed on a mobile device may be used to setup a prestaged transaction. When the mobile device is in the proximity to the kiosk to complete the prestaged transaction, a location of the mobile device may be verified using ambient sound recorded by a microphone of the mobile device. The ambient sound may be songs, tones, or ultrasonic sound played by a sound system near the kiosk. The recorded ambient sound may then be compared to expected audio from the sound system to determine whether the mobile device is in proximity to the kiosk.

9 Claims, 5 Drawing Sheets

(56) References Cited

U.S. PATENT DOCUMENTS

| | | | |
|---|---|---|---|
| 10,325,087 B1 | 6/2019 | Goodsitt et al. | |
| 2003/0120925 A1 | 6/2003 | Rose et al. | |
| 2015/0012441 A1 | 1/2015 | Atsmon et al. | |
| 2017/0236101 A1 | 8/2017 | Irudayam et al. | |
| 2018/0165663 A1* | 6/2018 | Naik | G06Q 20/3821 |
| 2020/0286086 A1* | 9/2020 | Chanduri | G06Q 20/3827 |
| 2020/0356980 A1* | 11/2020 | Singh | G06Q 20/3227 |
| 2020/0410093 A1* | 12/2020 | Martinovic | G07F 19/207 |
| 2020/0410994 A1* | 12/2020 | Burris | G07F 9/009 |
| 2021/0027295 A1* | 1/2021 | Raquepaw | G07F 19/206 |

OTHER PUBLICATIONS

International Search Report and Written Opinion of the International Searching Authority directed to related International Patent Application No. PCT/US21/19384, dated May 21, 2021; 13 pages.

\* cited by examiner

AUDIO-BASED SECURITY FOR AUTOMATED TELLER MACHINES

BACKGROUND

A customer may perform a variety of transactions using a mobile application downloaded on a mobile device such as a smartphone, tablet, laptop, etc. The customer may use the mobile device, for example, to withdraw money from a bank account using the mobile application at an automated teller machine (ATM). The customer may similarly use the bank issued card such as an ATM or Debit card to perform a transaction. However, if the customer's bank-issued ATM or Debit card is lost or stolen, a fraudulent transaction may be performed using the lost or stolen bank-issued ATM or Debit card. In addition to the banking transactions, other transactions may be fraudulently performed using, for example, a stolen driver's license or another identification card. Accordingly, there is a need to identify and prevent fraudulent transactions that may occur despite other safeguards.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
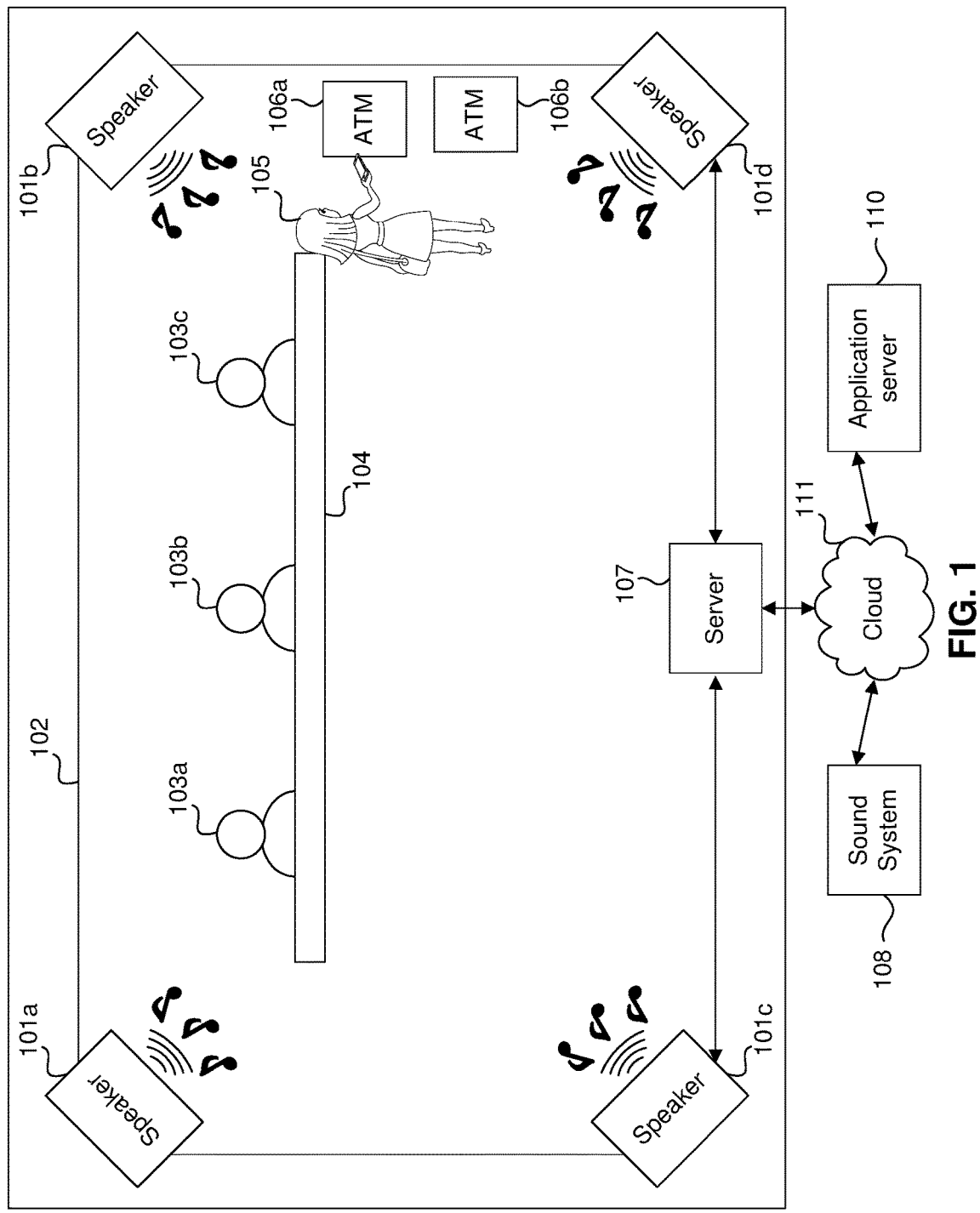
FIG. 1 illustrates a block diagram of an example environment in which systems and/or methods for validating user location based on sound may be implemented according to an example embodiment.

Smartphones have transformed how people receive news, shop, consume entertainment, keep an active social life, bank, etc. In the banking context, people were used to going inside a bank branch and interact with a teller to withdraw or deposit cash. Then, with the advent of ATMs, people could withdraw or deposit money without the help of a teller. ATMs can also provide people with an available balance in their accounts with the bank.

However, with smartphones, people can perform many transactions that previously required them to visit a location in person from the comfort of their home. For example, a person with a bank account at a bank may download a mobile application on their mobile device that allows the person access to their bank account with the bank. Using the mobile application, the person can deposit a check into their account by uploading an image of a front and a back of the check. The person can also transfer money from one account to another account, to another person, and/or to another account at a different bank, etc. The mobile device on which the mobile application may be downloaded may be a smartphone, a phone, a tablet, a laptop, a desktop, or any other computing device that may allow interacting with a bank account using a mobile application or a native browser application of the mobile device.

As described above, the bank account holder may perform a variety of transactions but cannot use the mobile application to receive cash from or deposit cash to their bank account, as physical tender must still be exchanged. As a result, the bank account holder completes cash transactions by going to the bank or an ATM to receive or deposit cash to their bank account. Additionally, a bank-issued ATM/Debit/Credit card is required to authenticate and gain access to the bank account in order to perform transactions such as withdrawing or depositing cash, checking account balances, etc., at the ATM, However, if the person is not carrying the bank issued ATM/Credit/Debit card, no transaction can be performed at the ATM.

Similarly, for some other type of transactions, the customer may be required to present an identification card, for example, a driver's license, or the bank issued ATM/Credit/Debit card. However, as described above, if the customer's ATM/Credit/Debit card, driver's license, or another type of identification card is lost or stolen, a fraudulent transaction may be performed using the lost or stolen ATM/Credit/Debit card, driver's license, or other type of identification card. However, a fraudulent transaction may be prevented if the location of the customer's UE device, such as a mobile phone, may be determined. If the location of the mobile phone may be identified not in the vicinity of the location where the transaction is taking place, the transaction may be fraudulent. To prevent fraud, the customer's mobile phone's location may be required to be shared with the bank or other institutes. Detecting the location of the mobile phone requires turning on the location service on the mobile phone. However, other ways to verify the user's mobile phone's location may also be required.

The present disclosure makes a transaction at the ATM possible without the use of the bank issued ATM/Debit/Credit card and with or without location service enabled on the mobile device. If the location service has been enabled on the mobile device, then verifying the location of the mobile device based on audio may provide an additional layer of security. By way of a non-limiting example, the mobile application downloaded on the mobile device may allow the mobile application user to stage a transaction to be performed later at the ATM.

Since the transaction is staged in advance, the mobile application user may not be required to use the bank issued ATM/Credit/Debit card at the ATM. However, a mobile user is still required to be authenticated to prove their identity and to receive service at the ATM. The mobile application user may be authenticated by the mobile application using a variety of authentication mechanisms. By way of a non-limiting example, the mobile application user may be authenticated based on the login and/or password used to access the mobile application on the mobile device. If the mobile application user uses biometric information such as a fingerprint, retina/iris scanning, facial recognition, etc., to login to the mobile application and/or the mobile device, such biometric information may be used to authenticate the mobile application user. By way of a non-limiting example, a second factor may be used in addition to the above-described authentication factors in a two-factor authentication style arrangement.

After successful authentication of the mobile application user, the mobile application user may stage the transaction using the mobile application, which may be referenced as a prestaged transaction in this disclosure because the transaction is staged using the mobile application to be completed later at the ATM. The prestaged transaction, for example, may be a transaction for withdrawing cash from a checking or savings account. Using the mobile application, the mobile application user may select the account and amount of money to withdraw from the account. As the mobile application user selects the amount of money to withdraw from the account, the mobile application may send one or more messages to an application server, which provides the mobile application access to the bank account. If there is sufficient balance, withdrawal of the requested money may be preapproved. The mobile application user may then be instructed to go to an ATM and use their phone used in prestaging the transaction to collect the requested money.

While the prestaged transaction in this disclosure is generally discussed with reference to an ATM transaction, the prestaged transaction in a non-banking example may be a ticket reservation. For example, the customer may have reserved a ticket at a sports arena and need to pick up the ticket using the credit or debit card used to pay for the ticket. To prevent a fraudulent transaction using the stolen credit or debit card and/or for additional security, it may be desired to identify the customer's UE device's location.

Because the mobile application user has used their phone, the prestaged transaction is associated with the phone of the mobile application user. By way of a non-limiting example, the prestaged transaction may be associated with a mobile application session that may have created the prestaged transaction. The mobile application session establishment procedure with an application server corresponding to the mobile application may include mobile device identifying parameters. The device identifying parameters may include International Mobile Equipment Identity (IMEI), Mobile Equipment Identifier (MEID) of the phone, a phone number associated with the phone, and/or a unique token installed on the device during the mobile application installation on the device. By way of a non-limiting example, each message from the mobile application may include the mobile device identifying parameters described above. Thus, a message to setup the prestaged transaction may include the mobile device identifying parameters that may associate the prestaged transaction with the phone of the mobile application user. By way of a non-limiting example, the mobile application, when installed on the phone, may require the mobile application to be associated with the phone, and the mobile application may be assigned an identification. Each message originated from the mobile application may then include the identification assigned to the mobile application, which thereby may associate the prestaged transaction with the phone of the mobile application user.

Accordingly, when the user visits a bank to complete the prestaged transaction, the user is first required to select an ATM at which the user would like to complete the prestaged transaction. This requires the prestaged transaction to be associated with the ATM. Once the prestaged transaction is associated with the ATM, the ATM may be instructed to perform actions that correspond with the prestaged transaction.

In order to associate the prestaged transaction with the ATM, the ATM display may be illuminated with a machine-readable image, for example, a Quick Response (QR) code. The QR code displayed on the ATM may identify the ATM. The QR code may include information identifying the ATM, for example, an identifier of the ATM. The ATM identifier uniquely identifies the ATM and location of the ATM, etc. The machine-readable image being displayed on the display of the ATM may be refreshed periodically. The machine-readable image may be any random image that uniquely identifies the ATM.

As the mobile application user visits the ATM, using a camera of the phone, the mobile application user may capture the image of the QR code. The mobile application or the phone may then send the captured QR code image to the application server. The application server receives the captured QR code image in one or more messages from the phone. The one or more messages from the phone may also include a device identifier(s) such as IMEI, MEID, and/or ESN, etc. Based on the device identifier, the application server may identify the prestaged transaction. In addition, based on the captured QR code image, the application server may identify the ATM and location of the ATM. Accordingly, the application server may associate the identified prestaged transaction with the identified ATM.

In order to associate the prestaged transaction with the ATM, as the mobile application user visits the ATM, the mobile application user may capture the image of the QR code, and the mobile application may decode the captured image of the QR code to determine an ATM identifier. The mobile application on the mobile device may then send ATM identifier to the application server. The application server receives the ATM identifier in one or more messages from the phone. The one or more messages from the phone may also include a device identifier(s) such as IMEI, MEID, and/or ESN, etc. Based on the device identifier, the application server may identify the prestaged transaction. In addition, based on the ATM identifier, the application server may identify the ATM and location of the ATM. Accordingly, the application server may associate the identified prestaged transaction with the identified ATM.

To prevent fraud, it may be required that the location of the mobile device be confirmed to be at the location of the ATM. The location of the mobile device may be confirmed using location service enabled on the phone. However, if the location service on the mobile device has been disabled, or as an additional method to verify the location of the mobile device, the location of the mobile device may be verified using sound. The mobile application may use a microphone of the mobile device, and sound waves detected by the microphone may be used to verify the location of the mobile device.

A sound system may be positioned in the vicinity of the ATM. The sound system may be communicatively coupled with an application server. The sound system may include one or more speakers. The sound system may transmit sound waves corresponding to the instructions received from the application server. The application server may transmit audio content to the sound system. The application server may also play ultrasonic sound on the speaker(s) at the location of the ATM as the location of the ATM determined based on the ATM identifier, as described above. The application server may play a song(s) from a playlist(s) modulated with ultrasonic sound on the speaker(s) at the location of the ATM determined as described above. The ultrasonic sound may not be heard by the human ear but may be recorded by the microphone of the mobile device.

Once the prestaged transaction is associated with an ATM, the mobile application user's location may be verified. By way of a non-limiting example, the prestaged transaction may be associated with the ATM when the mobile application user scans a machine-readable imaged being displayed on the ATM using the mobile application and/or the mobile device. The machine-readable image may include an ATM identifier, which may identify a physical location of the ATM and corresponding sound system. By way of non-limiting example, the prestaged transaction may be associated with the ATM when the mobile application user authenticates at the ATM, as described above, using login/password, biometric information, etc. The ATM may send information corresponding to the mobile application user's authentication along with an ATM identifier. The ATM identifier may identify the physical location of the ATM and the corresponding sound system while the authentication information may identify the prestaged transaction associated with the bank account.

Once the prestaged transaction and the ATM are associated, the application server may transmit audio content to the sound system identified as described above. The mobile application then may access the microphone on the mobile device to record an ambient sound. By way of a non-limiting example, the mobile application may be signaled by the application server to access the microphone on the mobile device to record the ambient sound. The mobile application may access the microphone on the mobile device to record the ambient sound based on a state of a finite state machine of the mobile application.

The recorded ambient sound would include a recording of the audio played through the speakers at the location of the ATM if the mobile device is in the vicinity of the ATM. However, if the mobile device is not in the vicinity of the ATM, it will not be able to record the audio played through the speakers at the location of the ATM. The mobile device may then send the recorded audio to the application server. The application server may compare the recorded audio with the audio played through the speakers in order to determine whether the mobile device is, in fact, in the vicinity of the ATM.

The application server may remove other surrounding noise recorded by the microphone of the mobile device to compare the mobile device recorded ambient sound with the audio played through the speakers at the location of the ATM. The application server may perform audio fingerprinting and/or spectrum analysis or other known methods and/or use tools for audio comparison to compare the mobile device recorded ambient sound with the audio played through the speakers at the location of the ATM.

If the comparison suggests the mobile device recorded ambient sound matches with the audio played through the speakers at the location of the ATM, the application server may determine the location of the mobile device at the location or in the vicinity of the ATM. Accordingly, the application server may instruct the ATM to execute the prestaged transaction.

However, if the comparison suggests the mobile device recorded ambient sound does not match with the audio played through the speakers at the location of the ATM, the application server may determine that the mobile device is not at the location or in the vicinity of the ATM. Accordingly, the application server may send a notification message to the ATM to display it to the mobile device user to complete the transaction with an associate or a teller.

The audio played through speakers at the location of the ATM may comprise human audible sound, the ultrasonic sound, and human audible sound modulated with ultrasonic sound. The human audible sound may be one or more songs selected from a playlist(s).

By way of non-limiting example, the mobile device recorded ambient sound may include time data associated with the recording using the microphone of the mobile device.

By way of non-limiting example, the mobile device recorded ambient sound may be compared with audio recorded by microphones located at various points in the vicinity of the ATM.

By way of a non-limiting example, a description of the following scenario would be helpful, in which the location of the user device may be validated based on sound. A banking customer has downloaded a mobile application on their mobile phone. Using the downloaded mobile application, the banking customer may transfer money between various banking accounts, deposit a check, and/or perform the balance inquiry. Using the downloaded mobile application, the banking customer can also set up a transaction, for example, to withdraw money from their checking account at the bank. Assuming that the banking customer has successfully set up the transaction to withdraw money from their checking account, the banking customer has been asked to go to an ATM to complete the transaction. The transaction may be referenced as a prestaged transaction since it is set up in advance to be completed later in time. Once the banking customer goes to an ATM and scans a QR code displayed on the ATM, the location of the banking customer is required to be determined or validated. However, if the location service has been disabled and/or a global positioning system (GPS) signals are not reachable at the location of the ATM, the location of the mobile phone of the banking customer may not be determined or validated. However, by recording sound signals and comparing the sound signals with reference sound signals known at the location of the ATM, the location of the mobile phone may be validated. In addition, upon validating that the mobile phone is at the location of the ATM, the prestaged transaction may be completed successfully.

Various embodiments to validate user location based on sound, as described above, will now be discussed with respect to the corresponding figures. The disclosure is not limited to validate user location based on sound at an ATM, but this disclosure applies to any kiosk that serves a product or any transaction through remote activation of the kiosk, based on the prestaged transaction, and validation of the location of the mobile device based on sound.

FIG. 1 illustrates a block diagram of an example environment 100 in which systems and/or methods described herein may be implemented. The environment 100 may include speakers 101a, 10b, 101c, and/or 101d, ATMs 106a and/or 106b, and a server 107 at the location of the ATMs 106a and/or 106b. Tellers 103a, 103b, and/or 103c at a teller desk 104 are shown, however, a person skilled in the art may understand that tellers 103a, 103b, and/or 103c and the teller desk 104 are optional and may not be present where the ATMs 106a and/or 106b are located. Speaks 101a, 101b, 101c, and/or 101d are connected with the server 107 via a link 102. The link 102 may be a wired link or a wireless link. The mobile device user 105, as shown in FIG. 1, is at the ATM 106a to complete the prestaged transaction that was set up as described above.

In FIG. 1, an application server 110 and a sound system 108 connected to a cloud 111 that may be an Internet, a virtual private network, a wireless local area network, or any network that is providing connectivity between the application server 110, the sound system 108, and the server 107 are shown. The sound system 108 may be a server comprising a database of various playlists, each comprising songs. The sound system 108 may be a system that may be a head-end providing various news and/or music channels from different sources such as one or more of broadcasting TV network(s), a streaming server(s), and/or satellite, cable and/or DSL provider(s). The sound system 108 may be a source of ultrasonic sound waves, and/or may modulate audible sound with ultrasonic sound waves.

The application server 110 may be a single application server or maybe more than one server providing the functions described herein. The application server 110 may coordinate with the sound system 108 and communicate with the server 107 to play a song(s) of a playlist(s) at the speakers 101a-101d. However, four speakers 101a-101d are shown here in FIG. 1, the total number of speakers may be more or less. In addition, the application server 110 may transmit a machine-readable image to the ATMs 106a and/or 106b. As described above, the machine-readable image is displayed on the ATMs 106a and/or 106b that uniquely identifies the ATM, and thereby identifies the location of the ATM. As described above, the machine-readable image displayed on the ATMs 106a and/or 106b may be periodically refreshed by the application server 110.

A mobile device user 105 has set up a prestaged transaction as described above and is at the ATM 106a to complete the prestaged transaction. A mobile device may be referenced as a user equipment (UE) device, and maybe a mobile phone, a smartphone, a tablet, a laptop, or any other computing device of the customer. The customer may download a mobile application on the UE device. The mobile application on the UE device may allow the customer to set up a transaction in advance for later execution at an automated teller machine (ATM) 106a. The transaction set up in advance for later execution at the ATM 106a may be referenced as a prestaged transaction in this disclosure. In some embodiments, instead of the mobile application on the UE device, the customer may set up the prestaged transaction using a web application on the UE device. The UE device may include a camera and/or a microphone. The camera and/or the microphone may be integrated with the UE device, or the camera and/or the microphone may be a pluggable device into the UE device.

In some embodiments, the ATMs 106a and/or 106b may include a keyboard, a card reader, a display, a slot to dispense cash, and a slot to receive cash, a check, or an envelope. The ATMs 106a and/or 106b may also include a camera, a fingerprint pad, and/or another appropriate system to collect biometric or other information from the customer for various purposes, including, for example, authentication of the user, etc. The ATMs 106a and/or 106b may also be equipped with one or more speakers.

In some embodiments, the ATMs 106a and/or 106b may include a display screen, a slot to dispense cash, and a slot to receive cash, a check, or an envelope. The ATMs 106a and/or 106b may include a camera, a fingerprint pad, and/or another appropriate system to collect biometric or other information from the customer. The ATMs 106a and/or 106b may include one or more physical buttons for the customer to request for help. The ATM 106a and/or 106b may also display one or more clickable buttons displayed on the display screen of the ATM 114. The ATMs 106a and/or 106b may also be equipped with one or more speakers.

In some embodiments, the display screen of the ATMs 106a and/or 106b may display a machine-readable image. The machine-readable image may be a barcode. The barcode may be a quick response (QR) code. The barcode displayed on the display of the ATMs 106a and/or 106b may be one-dimensional (1D) or two-dimensional (2D). The 2D barcodes may include rectangle, dots, hexagons, or any other geometric pattern. The machine-readable image may uniquely identify the ATMs 106a and/or 106b. By way of non-limiting example, the ATM 106a may display the machine-readable image that is different from a machine-readable image displayed on other ATM, the ATM 106b, in environment 100. The machine-readable image may be a random image, and which, as described above, may be unique for each ATM.

As described above, the machine-readable image displayed on the display screen of the ATM 114 may be used to associate the prestaged transaction with the ATM, so that instructions or commands may be sent to the ATM to complete the transaction.

In some embodiments, the machine-readable image may be a dynamic image. By way of a non-limiting example, the machine-readable image may be refreshed regularly, and a new machine-readable image may be displayed at a configured interval. The application server 110 may determine the machine-readable image and send the machine-readable image to the ATMs 106a and/or 106b. The application server 110 may also periodically send a new machine-readable image to the ATMs 106a and/or 106b. The application server 110 may communicate with the ATMs 106a and/or 106b over a secure or an unsecured communication network 111. The communication between the application server 110 and the ATMs 106a and/or 106b may be using an application program interface (API) message(s). The application server 110 may also store an association of the machine-readable image and the ATM as a pair in a database (not shown). The application server 110 may not reuse the machine-readable image for a configurable time period, for example, seven days after the machine-readable image is used once. In addition, the application server 110 may not use the machine-readable image in the same geographic zone for another configurable time period, for example, thirty days. Because the machine-readable image is not used in the same geographic zone and/or for a configurable time period, a fraudulent transaction may be avoided. The application server 110 may be a single application server or maybe more than one server providing the functions described herein.

The machine-readable image may include an ATM identifier, and the ATM identifier may correspond to the ATM and its location. This association of the ATM identifier and the ATM and its location may be stored in a database, and based on the ATM identifier, the ATM and its physical location may be identified by performing database lookup. To prevent fraud, by way of non-limiting example, each machine-readable image periodically generated by the application server 110 may include a different ATM identifier for the ATM then previously assigned ATM identifier for the same ATM. The application server 110 may also update the database storing association between the ATM identifier and the ATM and its physical location.

The server 107 and/or the application server 110 may be one or more servers, which may be a server described below with reference to FIG. 4.

In one example, the mobile device user 105 may set up a prestaged transaction to withdraw sixty dollars from his bank account using a mobile application on the UE device. During the prestaged transaction setup, the UE device may transmit, for example, an account number, a PIN, a transaction type (withdraw or deposit cash), amount of the transaction to the application server 110. The UE device may also transmit an identifier of the UE device to the application server 110. The application server may use the identifier of the UE device to identify the prestaged transaction. The application server may authorize the prestaged transaction after verification of user credentials based on user id and password, security questions, and/or biometric information, etc., and verification of transaction type and/or transaction amount against various policies such as number of transactions per day, maximum amount of withdrawal per day, etc. After successful setup of the prestaged transaction, the mobile device user 105 may be asked to go to an ATM to complete the prestaged transaction.

In some embodiments, when the mobile device user 105 reaches the ATM 106*a*, the customer may scan the machine-readable image, which is being displayed on the display of the ATM 106*a*, using the camera of the UE device. The scanned machine-readable image may be sent from the UE device to the application server 110. As described above, each message from the UE device to the application server 110 may include a device identifier of the UE device. The device identifier of the UE device may be an international mobile equipment identity (IMEI), a mobile equipment identifier (MEID), an electronic serial number (ESN), etc. The device identifier of the UE device may be used to search or identify the prestaged transaction.

The machine-readable image on the display of the ATM 106*a* is unique and includes information of an ATM identifier. Based on the scanned image received in the message from the UE device, the application server 110 may identify the ATM and its physical location based on information stored in the database either at the application server 110 or at a database server (not shown) that associates the machine-readable image and/or an ATM identifier associated with the machine-readable image with the ATM. By way of non-limiting example, the UE device may decode the scanned image and send the ATM identifier information in the scanned machine-readable image to the application server 110, and the application server 110 may identify the ATM and its physical location based on ATM identifier. The application server 110 may keep an up-to-date record of the machine-readable image and/or the ATM identifier being displayed on each ATM and for the time period for which the machine-readable image and/or the ATM identifier is/was displayed. Therefore, when the received scanned image and/or the ATM identifier does not match with the record of the application server 110, an appropriate message denying the prestaged transaction may be displayed on the UE device and/or the ATM 106*a*. If the received scanned image and/or the ATM identifier match with the record of the application server 110, the application server 110 may identify the prestaged transaction based on the device identifier sent from the UE device to the application server 110. The application server may associate the identified ATM with the prestaged transaction identified based on the device identifier, and then send one or more messages to the mobile application on the UE device to access the microphone of the UE device or the microphone connected with the UE device to record audio to determine or validate location of the UE device based on sound.

As described above, the application server 110 may coordinate with the sound system 108 to transmit a song(s) from a playlist(s) to the server 107 to be played via speakers 101*a*-101*d*. By way of non-limiting example, the application server 110 may coordinate with the sound system 108 to transmit ultrasonic sound waves to the server 107 to be played via speakers 101*a*-101*d*, or the application server may coordinate with the sound system 108 to transmit a song(s) from a playlist(s) modulated with ultrasonic sound waves to the server 107 to be played via speakers 101*a*-101*d*.

In an embodiment, the mobile application on the UE device may record audio for a configurable time duration, for example, five seconds, and may transmit the recorded audio segment to the application server 110 along with time data specifying recording start time and recording end time. By way of non-limiting example, the UE device may process the recorded audio segment at the UE device to accommodate network bandwidth, transmission speed, etc. Accordingly, the UE device instead of the application server 110 may determine the location of the UE device to prevent a fraudulent transaction as described herein.

In some embodiments, the UE device may stream the audio recorded by the microphone of the UE device for a configurable time duration, for example, five seconds, to the application server 110. The UE device may preprocess the recorded audio before streaming to accommodate network bandwidth, transmission speed, etc. The UE device may send a message to the application server 110, indicating recording start time and recording end time.

The application server 110 may compare the audio segment recorded by the microphone of the UE device and received by the application server 110 from the UE device with expected audio at the location of the ATM 106*a* to determine or validate the location of the UE device. Because the application server 110 coordinated with the sound system 108 to transmit to the server 107 audio to be played at the speakers 101*a*-101*d*, the application server 110 may maintain information of the audio being played at different locations associated with the location of the ATM and their corresponding time period. The application server 110 may then compare the recorded audio segment received from the UE device with the expected audio associated with the location of the ATM for the time data associated with the recorded audio segment.

In some embodiments, the application server 110 may use audio fingerprinting to compare the recorded audio segment received from the UE device with the expected audio associated with the location of the ATM for the time data associated with the recorded audio segment.

In some embodiments, the application server 110 may use spectrum analysis and/or other methods and/or tools to compare the recorded audio segment received from the UE device with the expected audio associated with the location of the ATM for the time data associated with the recorded audio segment.

In some embodiments, the application server 110 may remove ambient noise from the received recorded audio segment to compare the recorded audio segment received from the UE device with the expected audio associated with the location of the ATM for the time data associated with the recorded audio segment.

In some embodiments, the application server 110 may determine, based on the comparison as described above, that the received recorded audio segment matches the expected audio associated with the location of the ATM for the time data associated with the recorded audio segment. Accordingly, the application server 110 may determine that the mobile device user 105 is at the location of the ATM 106*a*. After determining or validating the location of the mobile device user 105 at the location of the ATM 106*a*, the application server 110 may instruct the ATM 106*a* to complete the prestaged transaction.

In some embodiments, the application server 110 may determine, based on the comparison as described above, that the received recorded audio segment does not match with the expected audio associated with the location of the ATM for the time data associated with the recorded audio segment. Accordingly, the application server 110 may determine that the mobile device user 105 is not at the location of the ATM 106*a*. After determining or validating the location of the mobile device user 105 is not at the location of the ATM 106*a*, the application server 110 may instruct the ATM 106*a* to reject the prestaged transaction. The application server 110 may instruct the ATM 106*a* to show a notification to the mobile device user 105 to complete the prestaged transaction at the teller, for example, the teller 103*a*, 103*b*, or 103*c*.

Figure 2:
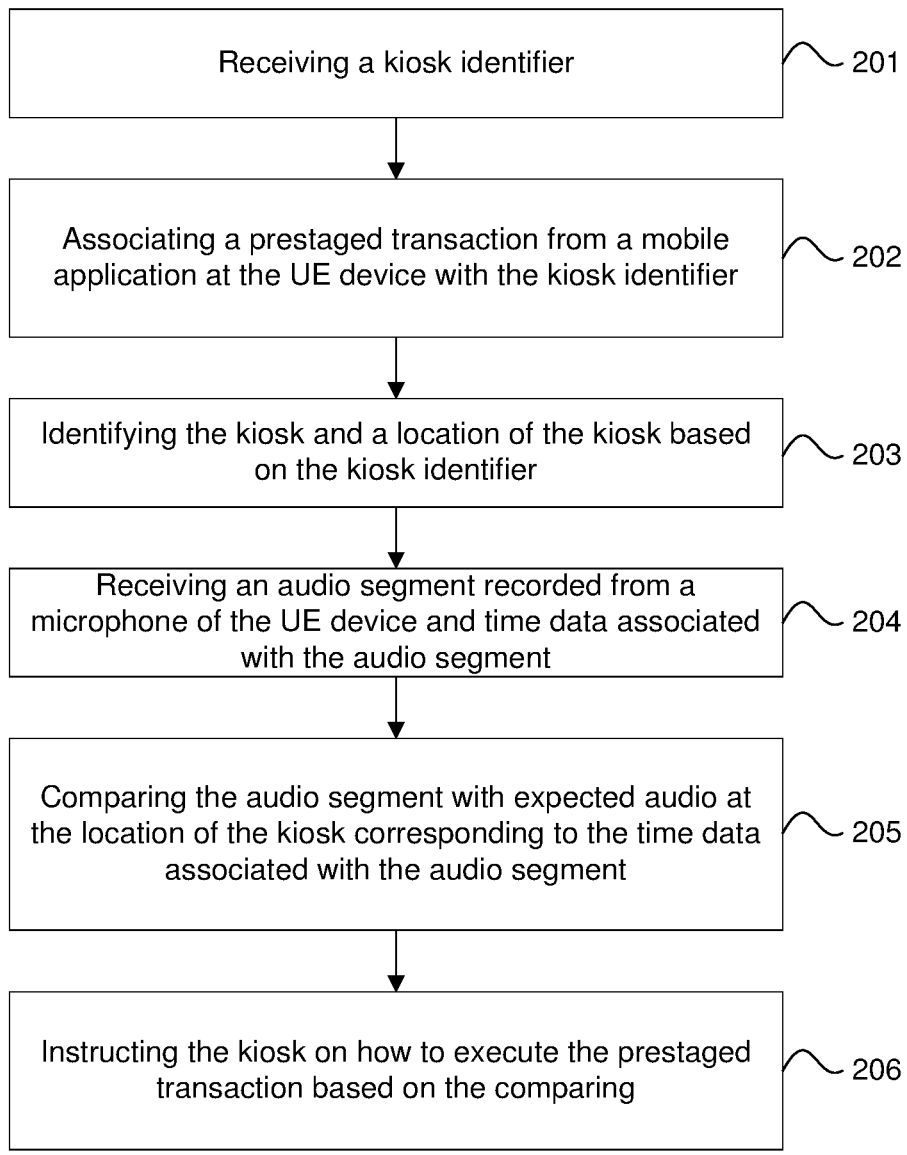
FIG. 2 illustrates a flowchart of a process for validating user location based on sound according to an embodiment.

FIG. 2 illustrates a flowchart 200 of a process for validating user location based on sound according to an embodiment.

In some embodiments, at step 201, as described above, the application server 110 receives a kiosk identifier or an ATM identifier. The mobile device user 105 has setup a prestaged transaction, and upon successful setup of the prestaged transaction, the mobile device user 105 may be asked to go to an ATM to complete the prestaged transaction. Accordingly, the mobile device user 105 is at the ATM 106*a*. On the display of the ATM 106*a*, a machine-readable image may be illuminated, and the mobile device user 105 may scan the machine-readable image using a camera of the UE device. Upon scanning the machine-readable image, the mobile application on the UE device may transmit the machine-readable image to the application server along with the device identifier of the UE device, as described above. The application server may retrieve an ATM identifier by decoding the scanned machine-readable image. By way of non-limiting example, the mobile application on the UE device may decode the machine-readable image to retrieve an ATM identifier from the machine-readable image, and send the ATM identifier to the application server 110 along with the device identifier of the UE device.

In some embodiments, at step 202, the application server may associate a prestaged transaction with the kiosk identifier. As described above, the prestaged transaction may be set up by the mobile device user 105 to execute or complete it later at the ATM 106*a*. Because the mobile device user using the UE device sets up the prestaged transaction, the device identifier of the UE device may identify the prestaged transaction. The application server may store the prestaged transaction and its information using the device identifier as a key into a database or memory. When the mobile device user 105 is at the ATM 106*a*, using the camera of the UE device, the mobile device user 105*a* may scan the machine-readable image illuminated on the display of the ATM 106*a*. The mobile application on the UE device may send the scanned image along with the device identifier to the application server 110. The application server 110 may determine the ATM identifier based on the scanned machine-readable image. The application server 110 may identify the prestaged transaction based on the device identifier of the UE device and associate the prestaged transaction with the ATM identifier.

In some embodiments, at step 202, the mobile application may decode the machine-readable image and send the ATM identifier to the application server along with the device identifier of the UE device. In addition, the application server may identify the prestaged transaction based on the device identifier of the UE device and associate the prestaged transaction with the ATM identifier.

In some embodiments, at step 203, the application server 110 may determine the ATM and location of the ATM based on the ATM identifier. As described above, the ATM identifier uniquely identifies the ATM. Therefore, based on the machine-readable image and/or the ATM identifier received from the UE device, the application server 110 may determine the ATM and the location of the ATM at which the mobile device user 105 may want to complete the prestaged transaction.

In some embodiments, at step 204, the application server 110 may receive audio recorded by the UE device. When the application server 110 associated the prestaged transaction with the ATM identifier at step 202, and identified the ATM and location of the ATM at step 203 as described above, to validate or determine location of the UE device associated with the prestaged transaction, the application server 110 may send one or more messages to the mobile application on the UE device to access the microphone and record audio for a configurable time duration, for example, thirty seconds. As described above, to use the mobile application to setup the prestaged transaction on the UE device, the user may be required to grant the mobile application access to the microphone to record audio. Accordingly, the mobile application may access the microphone and record audio for the configurable time duration and may transmit or stream the recorded audio segment to the application server 110. By way of non-limiting example, the mobile application may also transmit to the application server 110 time data associated with the recorded audio segment. The application server to synchronize audio for comparison may use the time data associated with the recorded audio segment. However, application server 110 may compare the received recorded audio segment with audio played at the corresponding ATM location in the most recent, for example, two minutes.

In some embodiments, at step 205, the application server 110 may compare the audio segment recorded by and received from the UE device with expected audio at the location of the ATM corresponding to the time data associated with the recorded audio segment. As described above, the application server 110 may remove ambient noise from the recorded audio segment to compare with the expected audio at the location of the ATM corresponding to the time data associated with the recorded audio segment. The application server 110 may perform audio fingerprinting and/or spectrum analysis to compare the audio segment recorded by and received from the UE device with expected audio at the location of the ATM corresponding to the time data associated with the recorded audio segment. A person skilled in the art may recognize that there are other methods available to compare audio, and hence this disclosure is not limited to the methods described here for comparing audio.

In some embodiments, at step 206, the application server 110 may instruct the ATM 106*a* on how to execute the prestaged transaction based on comparing the recorded audio segment with the expected audio at the location of the ATM corresponding to the time data associated with the recorded audio segment. If the comparing indicates that the recorded audio segment matches the expected audio at the location of the ATM corresponding to the time data associated with the recorded audio segment, the application server 110 may determine or validate that the UE device is at the location of the ATM 106*a*. Accordingly, the application server 110 may instruct the ATM 106*a* to execute the prestaged transaction. However, if the comparing indicates that the recorded audio segment does not match with the expected audio at the location of the ATM corresponding to the time data associated with the recorded audio segment, the application server 110 may determine or validate that the UE device is not at the location of the ATM 106*a*. Accordingly, the application server 110 may instruct the ATM 106*a* to reject the prestaged transaction. The application server 110 may instruct the ATM 106*a* and/or the UE device to display a message informing the mobile device user 105 to complete the prestaged transaction at a teller.

Figure 3:
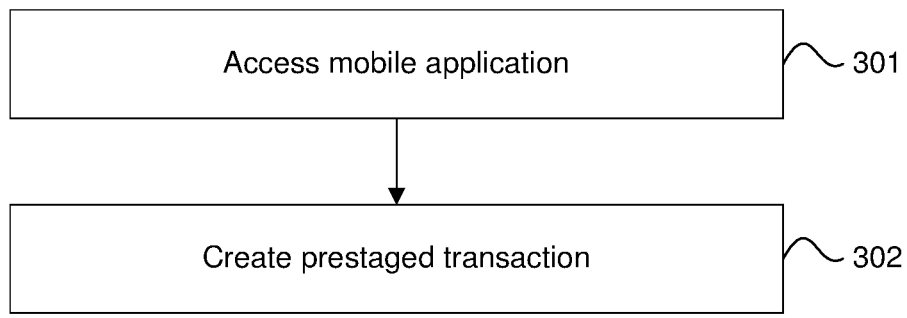
FIG. 3 illustrates a flowchart of a process for setting a prestaged transaction according to an embodiment.

FIG. 3 illustrates a flowchart of a process for setting a prestaged transaction according to an embodiment.

In some embodiments, at step 301, the mobile device user 105 may access the mobile application downloaded on their UE device to perform transactions. The mobile application may be used to set up a prestaged transaction to complete it later at the ATM 106a. At step 302, the mobile device user may set up a prestaged transaction, for example, to withdraw sixty dollars from a checking account using the mobile application. The prestaged transaction may be approved by the application server 110 to complete the prestaged transaction later at the ATM 106a or any other ATM, according to the available balance in the checking account, any overdraft policy, a limit on daily withdrawal limit, etc. If the prestaged transaction is approved by the application server 110 to complete later at the ATM 106a or any other ATM, the mobile device user 105 may be asked to go to an ATM to complete the prestaged transaction. The mobile device user 105 may also be informed that the prestaged transaction may be completed at any ATM if completed by the expiration time and date set for the prestaged transaction, which may be configurable, and maybe, for example, a couple of hours, or a couple of days, etc.

Figure 4:
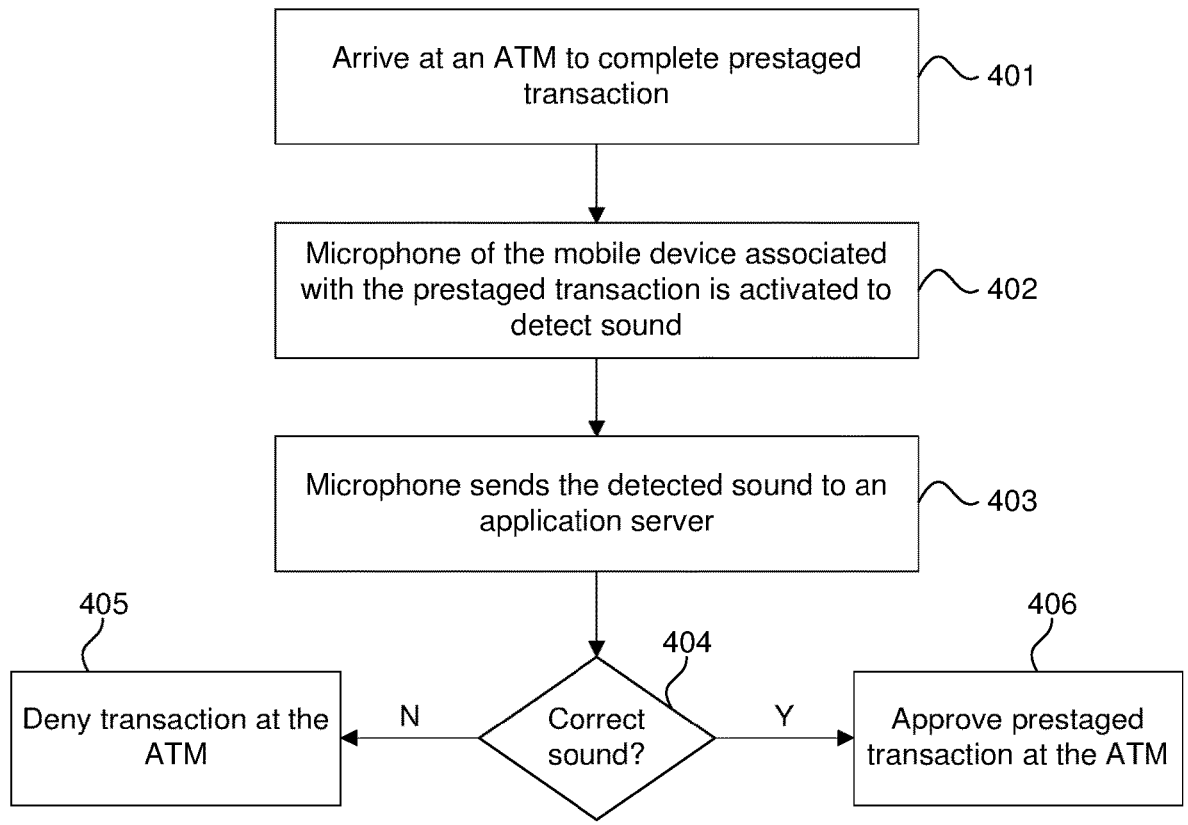
FIG. 4 illustrates a flowchart of a process for validating user location based on sound according to an embodiment.

FIG. 4 illustrates a flowchart of a process for validating user location based on sound according to an embodiment.

In some embodiments, at step 401, the mobile device user 105 may arrive at the ATM 106a after the prestaged transaction setup using the mobile application is approved as described above at step 302.

In some embodiments, at step 402, the application server 110 to record audio may enable the microphone of the UE device associated with the prestaged transaction. The mobile device user 105 at the ATM 106a may scan the machine-readable image or the displayed on the ATM 106a using a camera of the UE device. The scanned machine-readable image or the ATM identifier decoded from the scanned machine-readable image may be sent to the application server 110 along with the device identifier of the UE device as described above. The application server 110 may also determine the ATM identifier based on the received scanned machine-readable image from the UE device. Based on the device identifier, the application server 110 may instruct the mobile application on the UE device to access the microphone to record audio.

In some embodiments, at step 403, the application server 110 may receive an audio segment recorded by the microphone of the UE device and transmitted or streamed by the UE device of the mobile device user 105. The application server 110 at step 404, as described above, may compare the audio segment received by the application server. If the recorded audio segment matches with expected audio at the location of the ATM 106a corresponding to the time data associated with the recorded audio segment, then the ATM 106a may be instructed to execute the prestaged transaction as shown at 406. However, at step 404, if the recorded audio segment does not match with expected audio at the location of the ATM 106a corresponding to the time data associated with the recorded audio segment, the ATM 106a may be instructed to reject the prestaged transaction as shown at 405.

Figure 5:
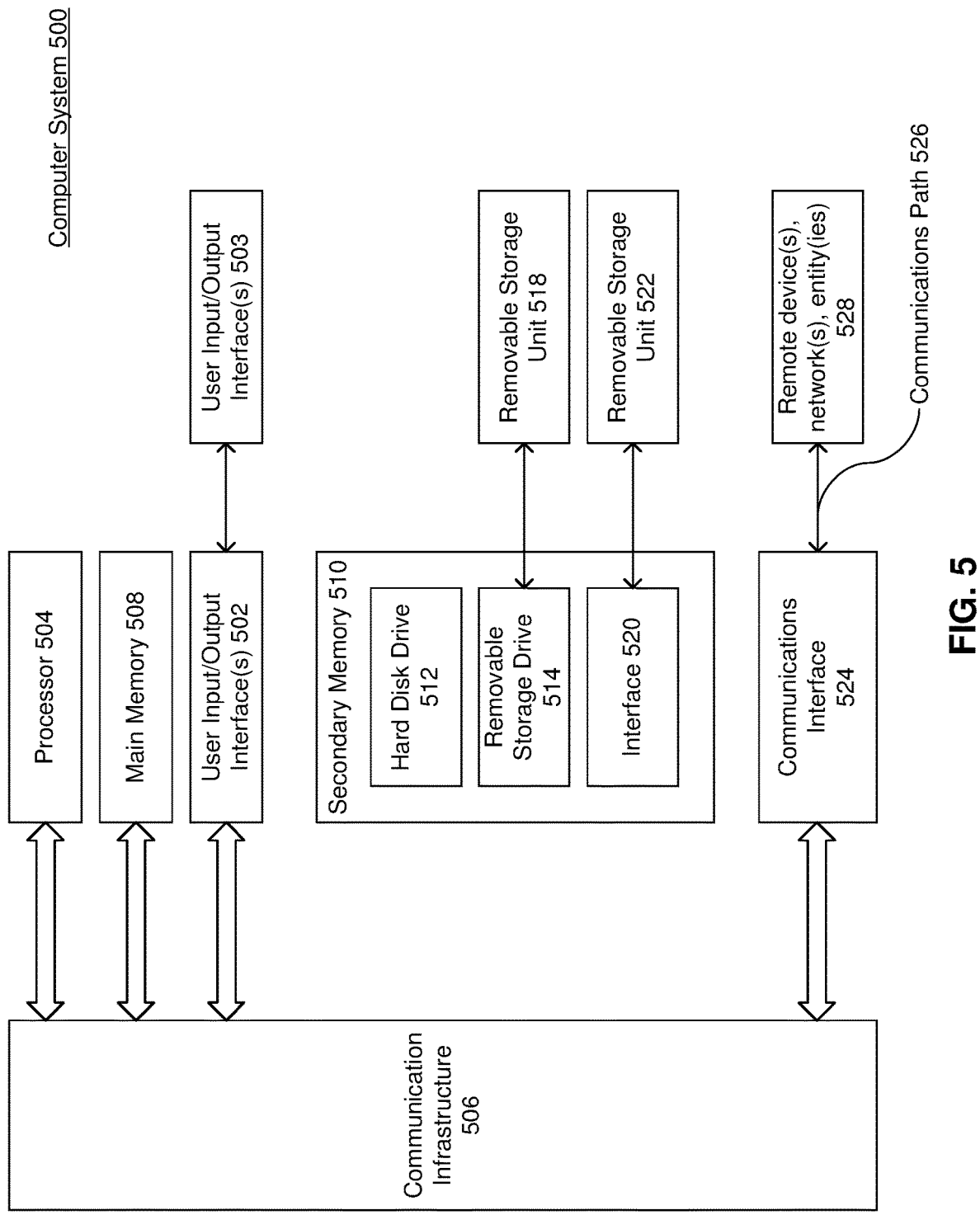
FIG. 5 illustrates an exemplary computer system according to an embodiment.

FIG. 5 illustrates an exemplary computer system according to an embodiment.

Various embodiments may be implemented, for example, using one or more well-known computer systems, such as a computer system 500, as shown in FIG. 5. One or more computer systems 500 may be used, for example, to implement any of the embodiments discussed herein, as well as combinations and sub-combinations thereof. The computer systems 500 may be used for the server 107 and/or the application server 110 described above.

The computer system 500 may include one or more processors (also called central processing units, or CPUs), such as a processor 504. The processor 504 may be connected to a communication infrastructure or bus 506.

The computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 500 may also include a main or primary memory 508, such as random access memory (RAM). Main memory 508 may include one or more levels of cache. Main memory 508 may have stored therein control logic (i.e., computer software) and/or data.

The computer system 500 may also include one or more secondary storage devices or memory 510. The secondary memory 510 may include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device/drive.

The removable storage drive 514 may interact with a removable storage unit 518. The removable storage unit 518 may include a computer usable or readable storage device having stored thereon computer software (control logic) and/or data. The removable storage unit 518 may be a floppy disk, magnetic tape, compact disk, DVD, optical storage disk, and/any other computer data storage device. The removable storage drive 514 may read from and/or write to the removable storage unit 518.

The secondary memory 510 may include other means, devices, components, instrumentalities, or other approaches for allowing computer programs and/or other instructions and/or data to be accessed by the computer system 500. Such means, devices, components, instrumentalities, or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication interface 524 may enable the computer system 500 to communicate and interact with any combination of external devices, external networks, external entities, etc. (individually and collectively referenced by reference number 528). For example, the communication interface 524 may allow the computer system 500 to communicate with the external or remote devices 528 over communications path 526, which may be wired and/or wireless (or a combination thereof), and which may include any combination of LANs, WANs, the Internet, etc. Control logic and/or data may be transmitted to and from the computer system 500 via the communication path 526.

The computer system 500 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as the computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

The claims in the instant application are different than those of the parent application or other related applications. The Applicant, therefore, rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method performed by a server coupled to a kiosk having a speaker and a screen, comprising:
   storing, by the server, an ID for the kiosk in a database;
   playing, by the server, audio through the speaker;
   generating, by the server, a quick response (QR) code from the ID for the kiosk and displaying, by the server, the generated QR code on the screen;
   associating, by the server, the audio played through the speaker with the ID for the kiosk and recording, by the server, the association, in the database;
   storing, by the server, a prestaged transaction in the database, wherein the prestaged transaction comprises a transaction amount and an ID of a mobile phone of a user;
   receiving, by the server, and from the mobile phone at the kiosk, the ID of the mobile phone and a scan of the screen of the kiosk, wherein the scan is of the QR code and comprises the ID for the kiosk;
   identifying, by the server, the prestaged transaction in the database by comparing the received ID of the mobile phone to the stored ID of the mobile phone;
   receiving, by the server, and from the mobile phone, a recording of the audio played at the kiosk and time data associated with the recording;
   retrieving, by the server, audio being played at the kiosk, from the database, using the ID for the kiosk from the received scan and comparing, by the server, the received audio to the retrieved audio according to the time data; and
   determining, by the server, and based on the comparing, that the received audio and the retrieved audio are the same and based on the determination, authorizing, by the server, the prestaged transaction.

2. The method of claim 1, wherein the kiosk is configured to dispense money responsive to the authorizing.

3. The method of claim 1, further comprising:
   receiving, from the mobile phone, and by the server, a selection of the kiosk at which to complete the prestaged transaction; and associating, by the server, the kiosk with the prestaged transaction based on the received selection.

4. The method of claim 1, further comprising periodically refreshing, by the server, the QR code at each kiosk.

5. The method of claim 1, wherein the kiosk is one of a plurality of kiosks associated with the server, wherein each of the plurality of kiosks comprises a speaker and a screen.

6. A system comprising:
a server coupled to a kiosk having a speaker and a screen, and
the server further comprising one or more processors and storing computer-executable instructions, that, when executed by the one or more processors, cause the one or more processors to perform steps of:
storing an ID for the kiosk in a database;
playing audio through the speaker;
generating a quick response (QR) code from the ID for the kiosk and displaying the generated QR code on the screen;
associating the audio played through the speaker with the ID for the kiosk and recording the association in the database;
storing a prestaged transaction in the database, wherein the prestaged transaction comprises a transaction amount and an ID of a mobile phone of a user;
receiving from the mobile phone at the kiosk, the ID of the mobile phone and a scan of the screen of the kiosk, wherein the scan is of the QR code and comprises the ID for the kiosk;
identifying the prestaged transaction in the database by comparing the received ID of the mobile phone to the stored ID of the mobile phone;
receiving from the mobile phone, a recording of the audio played at the kiosk and time data associated with the recording;
retrieving audio being played at the kiosk, from the database, using the ID for the kiosk from the received scan and comparing the received audio to the retrieved audio according to the time data; and
determining, and based on the comparing, that the received audio and the retrieved audio are the same and based on the determination, authorizing the prestaged transaction, or
determining, and based on the comparing, that the received audio and the retrieved audio are not the same and based on the determination that they are not the same providing an instruction to the kiosk to reject the prestaged transaction.

7. The system of claim 6, wherein the kiosk is one of a plurality of kiosks associated with the server, wherein each of the plurality of kiosks comprises a speaker and a screen.

8. A non-transitory, tangible computer-readable medium of a server, the medium storing executable instructions that when executed by one or more processors of the server, wherein the server is coupled to a kiosk having a speaker and a screen, cause the one or more processors to perform steps of:
storing an ID for the kiosk in a database;
playing audio through the speaker;
generating a quick response (QR) code from the ID for the kiosk and displaying the generated QR code on the screen;
associating the audio played through the speaker with the ID for the kiosk and recording the association in the database;
storing a prestaged transaction in the database, wherein the prestaged transaction comprises a transaction amount and an ID of a mobile phone of a user;
receiving from the mobile phone at the kiosk, the ID of the mobile phone and a scan of the screen of the kiosk, wherein the scan is of the QR code and comprises the ID for the kiosk;
identifying the prestaged transaction in the database by comparing the received ID of the mobile phone to the stored ID of the mobile phone;
receiving from the mobile phone, a recording of the audio played at the kiosk and time data associated with the recording;
retrieving audio being played at the kiosk, from the database, using the ID for the kiosk from the received scan and comparing the received audio to the retrieved audio according to the time data; and
determining, and based on the comparing, that the received audio and the retrieved audio are the same and based on the determination, authorizing the prestaged transaction, or
determining, and based on the comparing, that the received audio and the retrieved audio are not the same and based on the determination that they are not the same providing an instruction to the kiosk to reject the prestaged transaction.

9. The non-transitory, tangible computer-readable medium of the server of claim 8, wherein the kiosk is one of a plurality of kiosks associated with the server, wherein each of the plurality of kiosks comprises a speaker and a screen.

* * * * *